United States Patent [19]

Gloth et al.

[11] Patent Number: 4,463,170

[45] Date of Patent: Jul. 31, 1984

[54] POLYMERIC COMPOUNDS PREPARED FROM DIPHENYLAMINE AND DIHYDROXYALKYLBENZENE

[75] Inventors: Richard E. Gloth, Copley; James J. Tazuma, Stow; Robert A. Smith, Akron, all of Ohio

[73] Assignee: The Goodyear Tire & Rubber Company, Akron, Ohio

[21] Appl. No.: 460,979

[22] Filed: Jan. 26, 1983

[51] Int. Cl.$^3$ ............................................. C08G 73/00
[52] U.S. Cl. ..................................... 528/422; 528/392
[58] Field of Search ........................................ 528/422

[56] References Cited

U.S. PATENT DOCUMENTS 3,405,104 10/1968 Wakeman et al. ................... 528/422

Primary Examiner—Harold D. Anderson
Attorney, Agent, or Firm—D. O. Nickey; R. D. Thompson

[57] ABSTRACT

This invention discloses a novel class of polymeric diphenylamine compounds. The compounds are produced by reacting diphenylamine with a dihydroxyalkylbenzene having either meta or para orientation in the presence of an acid catalyst. The polymeric diphenylamine compounds are useful as antioxidants.

13 Claims, No Drawings

POLYMERIC COMPOUNDS PREPARED FROM DIPHENYLAMINE AND DIHYDROXYALKYLBENZENE

BACKGROUND OF THE INVENTION

This invention relates to the preparation of a class of polymeric products from the reaction of diphenylamine with at least one of the following difunctional alkylating agents: 1,4-di-α-alkylalkenylbenzene, 1,4-di-α-hydroxyalkylbenzene, 1,3-di-α-alkyl-alkenylbenzene or 1,3-di-α-hydroxyalkylbenzene. In particular, the present invention relates to reacting the diphenylamine with the difunctional alkylating agent in the presence of an acid catalyst to produce polymeric compounds useful as an antioxidant for the protection of oxidizable organic polymers.

BACKGROUND ART

Alkylated diarylamines have been widely used as antioxidants primarily for the protection of thermosetting rubbers and, to a lesser extent, thermoplastic polymers. When the diarylamine is diphenylamine, the alkylation products have been found to be very effective antioxidants which exhibit discoloration of the compounded material upon thermal aging. In addition, the compounded products using the alkyl and aryl substituted diphenylamine antioxidants have a tendency to stain an adjacent surface. These deficiencies make the substituted diphenylamines unsatisfactory materials for use in light-colored compounded materials. The tendency to discolor and stain limits their use in rubbers to dark-colored or black articles in applications where slight contact staining can be tolerated. The substituted diphenylamines have found very little use as stabilizers or anti-degradants in thermoplastic polymers such as high molecular weight polyester due to the staining tendency and discoloration during use at high temperatures.

It was known in the art that diphenylamine could be reacted with α,α'dihydroxy-1,4 diisopropylbenzene in the presence of hydrochloric acid to yield a mixture of 2-(2-anilinophenyl)-2-(4-isopropenylphenyl)propane and 2-(4-anilinophenyl)-2-(4'-isopropenylphenyl)-propane. The experimental work which led to this invention was undertaken with the purpose of alkylating diphenylamine with the expectation that the reaction product would be a simple compound in which the diphenylamine would be selectively alkylated in the para position by the diolefinic alkylating agent. Contrary to the teachings in the art, polymeric products were produced instead. Further structural investigation revealed that dimer linkages were formed from the diolefin reagent. These dimer linkages contributed to the formation of polymers. The products produced varied in composition and molecular weight distribution to make them useful in a wide variety of polymers as antioxidants. Such results were surprising and unexpected in view of the teachings of the prior art.

BRIEF DESCRIPTION OF THE INVENTION

This invention relates to the synthesis of a class of novel polymeric compounds having varying physical properties which make them useful as antioxidants and stabilizers in a wide variety of high molecular weight polymers.

An aspect of this invention is a polymeric compound comprising randomly distributed repeat units derived from diphenylamine and an additional component, said additional component comprising one or more compounds of structural formula (1)

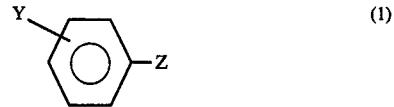

said polymeric compound containing one or more of structures V, VI, and VII:

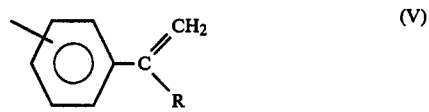

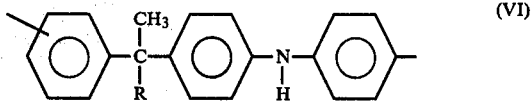

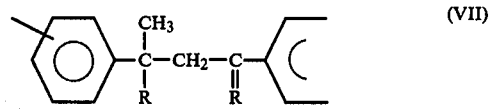

wherein Y is para or meta relative to Z, Y and Z are the same or different radicals selected from the group consisting of

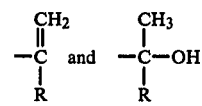

and R is an alkyl radical of from 1 to 8 carbon atoms, and R' is an alkylidene radical of from 1 to 7 carbon atoms Another aspect is a process for making a polymeric compound comprising: contacting diphenylamine with second reactant in the presence of an acid catalyst, said second reactant comprising one or more compounds having the structural formula (1)

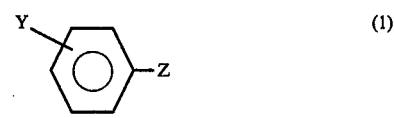

and wherein Y is para or meta relative to Z, Y and Z are the same or different radicals selected from the group consisting of

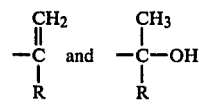

and R is an alkyl radical of from 1 to 8 carbon atoms.

MORE DETAILED DESCRIPTION

The products of the present invention are the polymeric reaction products component of diphenylamine and at least one additional reactant or having the structural formula (1) above. The preferred additional reactants or components are compounds having the structures (I), (II), (III) and (IV)

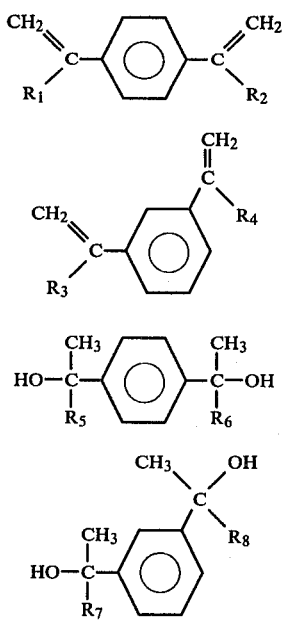

wherein $R_1$, $R_2$, $R_3$, $R_4$, $R_5$, $R_6$, $R_7$, and $R_8$ are the same or different radicals selected from the group consisting of alkyl groups of from 1 to 8 carbon atoms.

Compounds of structures III and IV readily undergo a dehydration reaction to form the diolefins of corresponding structure I and II.

Illustrative compounds of Structure I are 1,4-diisopropenylbenzene, 1,4-di-α-ethylvinylbenzene, 1-isopropenyl-4-α-ethylvinylbenzene, 1-α-ethylvinyl-4-α'-isopropylvinylbenzene, and 1,4-di-α-isopropylvinylbenzene.

Illustrative compounds of Structure II are 1,3-diisopropenylbenzene, 1,3-di-α-ethylvinylbenzene, 1-isopropenyl-3-α-ethylvinylbenzene, 1-α-ethylvinyl-3-α'-isopropylvinylbenzene, and 1,3-di-α-isopropylvinylbenzene.

Illustrative compounds of Structure III are 1,4-di-(α-hydroxyisopropyl)benzene, 1,4-di-(α-hydroxysec-butyl)benzene, 1-(α-hydroxyisopropyl)-4-(α-hydroxysec-butyl)benzene, 1,4-di-(α-hydroxy)-sec-amylbenzene, and 1-(α-hydroxyisopropyl)-4-(α-hydroxy-sec-amyl)benzene.

Illustrative compounds of Structure IV are 1,3-di-(α-hydroxyisopropyl)benzene, 1,3-di-(α-hydroxysec-butyl)benzene, 1-(α-hydroxyisopropyl)-3-(α-hydroxy-sec-butyl)benzene, 1,3-di-(α-hydroxy)-sec-amylbenzene, and 1-(α-hydroxyisopropyl)-3-(α-hydroxy-sec-amyl)benzene.

Most preferred reactants are those having a methyl group in the position noted by $R_1$ through $R_8$ herein above, namely, 1,3- or 1,4-diisopropenylbenzene; and 1,3- or 1,4-di-(α-hydroxyisopropyl)benzene. The compounds of Structures I and II will be sometimes referred to in subsequent discussion of the reaction as a diolefin or as the diolefinic alkylating agent and compounds of Structures III and IV will be referred to as a dialcohol or as the dialcoholic alkylating agent.

The term polymeric compound means large molecules composed of more than one occurrence of at least one of the beginning reactants. The term polymer may be used interchangeably with polymeric compound. The simple compounds formed by the reaction of a single diphenylamine molecule with a single molecule of the second reactant are specifically excluded from the term polymer or polymeric compound as used herein. A practitioner will recognize that the initial structure of the reactant will be altered during linkage to the adjacent unit in the larger molecule. The term repeat unit means a structure that occurs more than once in the polymeric compound and which differs from the structure of the initial reactant due to changes resulting from molecular reorientation during the linking to the adjacent structure. The changes may include, but are not limited to, addition to a double bond or the addition or removal of a hydrogen atom from the initial reactant.

Catalysts useful in this invention are the Bronsted acid and Lewis acid type catalysts known to be useful in alkylation reactions. Such known catalysts include protonic acids such as $H_2SO_4$, $HCl$, $H_3PO_4$, $HClO_4$; metal halides such as $BF_3$, $BCl_3$, $AlCl_3$, $AlBr_3$, $SnCl_4$, $ZnCl_2$, $SbCl_3$ and their etherates; acidic clay and acid-activated clays. The choice of a particular catalyst is dependent upon many factors including the melting or boiling points of the reactants, desired rate of reaction, solvent, and pressure and temperature limitations of the production equipment, etc. The acidic clay catalysts offer the advantage of easy separation after the reaction is complete. Materials representative of this class of catalyst include the Filtrol (Filtrol Corporation) and Girdler K-series clays (Chemetron Corporation) or silica-alumina catalysts such as Durabead I (Mobil Oil Corporation). The Filtrols are acid-activated crystalline clays composed essentially of silica and alumina. The acid numbers of the clays range from 1.2 to 16. Super Filtrol Grade 1 has an acid number of 8. The Girdler K-series catalysts are acid-activated clays produced from the mineral Montmorillonite, an aluminum hydrosilicate with ideal formula $Al_2O_3 \cdot 4SiO_2 \cdot H_2O + XH_2O$. Their acidity ranges from pH2.1 to pH greater than 4. Durabead catalysts are non-zeolitic coprecipitated silica-aluminas of low crystallinity. When higher yields are desired the metal halides or their etherates may be utilized.

The reactions can be carried out without solvent at or above the melting points of the reactants or can be carried out in a solvent. The solvent can be an aliphatic $C_6$ to $C_{12}$ hydrocarbon or an aromatic or haloaromatic ($C_6$ to $C_9$) hydrocarbon or a $C_6$ to $C_9$ aliphatic halohydrocarbon. Examples of solvents are hexane, heptane, benzene, toluene, xylene and chlorobenzene. The preferred solvents are toluene and xylene.

The molar ratio of the reactants may be selected to achieve the desired ratio in the final polymeric product. The preferred molar ratio of the dialcoholic or diolefinic alkylating agent to diphenylamine may range from 4:1 to 1:4. The most preferred ratios range from 2.67:1 to 0.67:1. The method of addition of reactants varies depending upon the type of product desired. A solution of diolefin at 25° can be added quickly or dropwise to a stirred refluxing mixture of catalyst and diphenylamine solution. If dialcohol is used it can be added slowly in a boiling solution. The addition of the selected dialcoholic or diolefinic alkylating agent to hot amine solutions maximizes alkylation of the diphenylamine and minimizes olefinic dimerization. If a higher melting, higher molecular weight product is desired, dimerization can be promoted by adding the diolefin solution all at once to the diphenylamine solution before heating begins.

The reactions can be conveniently run at atmospheric pressure, but may also be run at other pressures. Reaction temperature may range from 25° C. to 200° C. with the preferred range being 60° C. to 140° C.

Moieties which are present in the polymeric compounds of this invention may include one or more of the following structures:

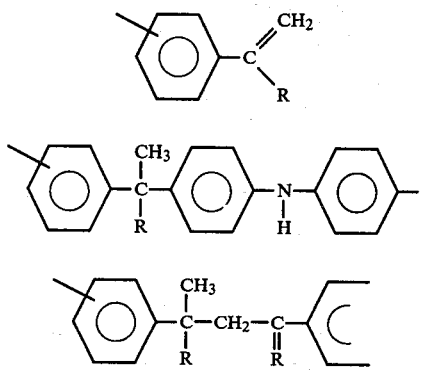

where R is an alkyl group of from 1 to 8 carbon atoms, and R' is an alkylidene radical of from 1 to 7 carbon atoms The substituent group on the nitrogen-substituted aromatic rings is predominately in the para position relative to the nitrogen. On non-nitrogen substituted aromatic rings, the alkyl groups may be either meta or para orientation depending upon the orientation of the initial reactants.

Nuclear magnetic resonance (NMR) analysis may be used to determine the presence of the structures V, VI and VII and thus partially characterize the polymeric product of a particular reaction condition. The relative percentage of each of the structures V, VI, VII present in the polymeric compound can be determined. The relative percentages are based on the quantity of structure V available for reaction. Where an initial reactant contains a hydroxyl end group it is assumed to dehydrate to the structure V prior to reaction to form VI and VII. The relative percentages of structures V, VI, VII may preferably have the following ranges: Structure V from 0 to about 25 percent; Structure VI from about 30 to nearly 100 percent; and Structure VII from about 1 to about 50 percent.

In addition to NMR characterization, molecular weight can be used to further describe the polymeric compounds of this invention. The molecular weights of the products as determined by gel permeation chromatography may range from about 425 to about 200,000.

The following examples are intended to illustrate, but not limit, the practice of the present invention. The structural compositions of the products prepared in the following examples were determined by NMR spectroscopy. The structural compositions reported represent the relative percentages of each of the following moieties based on the initial quantity of (A) available for reaction:

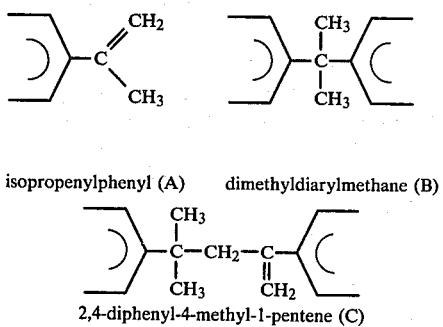

Molecular weight distributions were determined by gel permeation chromatography (GPC) utilizing 100, 500, 1000, and 10,000 angstrom Micro Styrogel columns (Waters and Associates) and polystyrene standards from Pressure Chemical Company. Molecular weight distributions were calculated as polystyrene equivalents. Mn and Mw are the number and weight average molecular weights, respectively as derived from the GPC analysis. Melting points were determined by the capillary tube method in accordance with ASTM D-1519. All temperatures are °C. All softening points determined by ring and ball method, ASTM E-28.

EXAMPLES

EXAMPLE 1

43.49 grams (0.26 mole) of diphenylamine (DPA) and 1.87 grams (equivalent to 15 weight% of alkylating agent) of Super Filtrol Grade 1 (SF1) were added to 150 milliliters of toluene. The mixture was rapidly stirred and heated to reflux to remove water azeotropically from catalyst and solvent. Enough toluene was then distilled to raise the reflux temperature to 130° C.

A boiling solution of 12.5 grams (0.064 mole) of 1,4-di-(α-hydroxyisopropyl)benzene in 200 milliliters of toluene was then added over a 30 minute period. When addition was complete, the reflux temperature had dropped to 112° C. and was maintained there for 30 minutes. 2.3 milliliters of water (67% of theory) had collected in a Dean-Stark trap.

Enough toluene was removed to raise the reflux temperature to 130° C. Reflux was continued for 30 minutes more. 250 milliliters of toluene was then added to facilitate filtration. The solution was filtered at 112° C. to obtain a light yellow filtrate. Rotary evaporation yielded a light pink residue. Excess diphenylamine was distilled off under vacuum at 88° C., 0.05 millimeters of Hg to recover 22.86 grams. 25.51 grams of solid light yellow resin remained and had a ring and ball softening point of 80°-90° C.

EXAMPLE 2

26.75 grams (0.158 mole) of diphenylamine was dissolved in 50 milliliters of toluene. 10.0 grams of Super Filtrol Grade 1 was added with stirring followed by a solution of 66.67 grams (0.42 mole) of p-diisopropenylbenzene (DIB) in 100 milliliters of toluene. The mixture was rapidly stirred and heated to reflux. After a 2.5 hour reflux period, 150 milliliters of toluene was added to the dark brown reaction mixture, which was filtered to give a cloudy pink solution. Evaporation of solvent yielded 88.2 grams of white resin, ring and ball softening point of 84°-93° C. The polymer's structural composition was 14% A, 51% B, and 35% C with molecular weight range of 485-3500.

EXAMPLE 3

Example 2 was repeated in refluxing xylene. DIB solution was added to the refluxing diphenylamine-catalyst mixture over a 36 minute period. Stirring at reflux was then continued for 5 hours. 70 grams of pink resin was obtained having a ring and ball softening point of 74°-86° C. The polymer's structural composition was 23% A, 47% B, and 30% C.

EXAMPLE 4

To a stirred solution of 26.75 grams of diphenylamine (0.158 mole) in 50 milliliters of toluene were added 7.5 grams of Super Filtrol Grade 1 and a solution of 50 grams (0.315 mole) of p-diisopropenylbenzene in 75 milliliters of toluene. The resulting mixture was heated to reflux. After a 5-hour reflux period, the mixture was filtered. Evaporation of solvent yielded 67.41 grams of colorless resin having a ring and ball softening point of 86°-96° C. The polymer's structural composition was 14% A, 60% B and 26% C with a molecular weight range of 485 to 3160.

EXAMPLE 5

To a stirred solution of 26.75 grams (0.158 mole) of diphenylamine in 50 milliliters of toluene were added 5.63 grams of Super Filtrol Grade 1 and a solution of 37.50 grams (0.237) p-diisopropenylbenzene in 50 milliliters of toluene. The mixture was heated to reflux with rapid stirring. After a 1.25 hour reflux period, the mixture was filtered. Evaporation of solvent yielded 63.96 grams of pink resin softening at 59°-64° C. (by ring and ball). The polymer's structural composition was 16% A, 59% B and 25% C with a molecular weight range of 485-3000.

EXAMPLE 6

A mixture of 8.95 grams (0.0529 mole) of diphenylamine in 16.75 milliliters of toluene and 3.75 grams of Super Filtrol Grade 1 was heated to reflux until any moisture present was removed. A solution of 12.5 grams (0.079 mole) of p-diisopropenylbenzene in 18.75 milliliters of toluene was added to the refluxing stirred solution within 5 minutes. Reflux was continued for 5 hours. The mixture was then filtered. Evaporation of solvent yielded 18.36 grams of white powder melting at 129°-136° C. as determined by the capillary tube method. The polymer's structural composition was 10% A, 78% B, and 13% C with a molecular weight range of 485 to 3500.

EXAMPLE 7

A mixture of 26.75 grams (0.158) of diphenylamine and 3.75 grams of Super Filtrol Grade 1 in 50 ml. toluene was heated to reflux with rapid stirring. A solution of 25.0 grams (0.158 mole) of DIB in 37.5 milliliters of toluene was then added within 5 minutes. Reflux was continued for 5 hours with a 10 milliliter aliquot being removed after 1.25 hours. The aliquot and the final reaction mixture were filtered and evaporated to dryness. The 1.25 hour product was a soft pink resin with structural composition of 13% A, 67% B, and 20% C and molecular weights of 500, 750, 900 and 1045. The 5 hour product was a white solid with structural composition of 79% B and 21% C melting point of 97°-103° C.

EXAMPLE 8

Example 7 was repeated with twice the clay concentration. No intermediate samples were taken. The product after 5 hours reflux was a white solid melting at 115° to 123° C. The polymer's structural composition was greater than 90% B.

EXAMPLE 9

Example 7 was repeated in refluxing xylene. The products were white solids. The 30 minute sample melted at 101° to 106° C., the 1.25 hour sample at 109° to 115° C., and the 5 hour product at 147°-154° C. The 5 hour product's structural composition was greater than 90% B.

EXAMPLE 10

Example 7 was repeated in xylene with twice the clay concentration. Aliquots were removed at various times and yielded white solids. The 30 minute product melted at 134° to 144° C., the 1.25 hour product at 157° to 161° C., the 3.5 hour product at 157° to 161° C. and the 5 hour product at 157°-161° C. The 5 hour product's structural composition was greater than 90% B with a molecular weight range of 1000 to 3160.

EXAMPLE 11

A solution of 37.8 grams (0.253 mole) diphenylamine in 75 milliliters of xylene was heated to reflux with 3.75 grams of Super Filtrol Grade 1. A solution of 25.0 grams of p-diisopropenylbenzene (0.157 mole) in 37.5 milliliters of xylene was added over a 40 minute period. Reflux was continued for 5 more hours with aliquots being taken at 1.5 and 3.0 hours. The products were white solids with the 1.5 hour sample melting at 133°-141° C. and the 3.0 hour sample at 136°-144° C. The 5 hour product melted at 166° to 169° C. and consisted of nearly 100% B with a molecular weight range of 900-3000. X-ray analysis revealed that this soluble alternating copolymer is crystalline.

EXAMPLE 12

Example 11 was repeated using low moisture Filtrol 13 (acid number 16 rather than 8 for Super Filtrol Grade 1). The 5 hour white product melted at 162° to 165° C.

EXAMPLES 13-15

Non-solvent, bulk reactions were carried out in the following manner: Diphenylamine (DPA) and the second reactant (DIB) were premixed by melting both reactants and blending in the ratio desired for the reaction. The appropriate weight was placed into the reaction vessel and the head space then flushed with nitrogen gas. The reaction vessel was sealed and the reactants were preheated to 80° C. The appropriate amount of boron trifluoride ethereate ($BF_3.OEt_2$) catalyst was then introduced into the reaction vessel and the vessel was maintained at 80° C. for three hours. Laboratory scale experiments utilized a glass vial as a reaction vessel with a self-sealing rubber lined cap through which the catalyst could be injected without the introduction of oxygen or moisture into the vessel. The reaction was terminated by injecting into the reaction vessel isopropyl alcohol, followed by triethanolamine. The solid product of the reaction was purified by solvating in methylene chloride and precipitating with methanol.

The table below summarizes the reactions and molecular weights of the reaction products.

TABLE I

BULK POLYMERIZATIONS AT 80° C.

| Example | Second Reactant (DIB) | Molar Charge Ratio, DPA:DIB | Catalyst Charge, Moles | Molecular Weight Mn | Mw |
|---|---|---|---|---|---|
| 13 | 1,4-diisopropenylbenzene | 3.3:3.3 | 0.1 | 2100 | 4700 |
| 14 | 1,4-diisopropenylbenzene | 3.3:3.3 | 0.03 | 2900 | 6300 |
| 15 | 1,3-diisopropenylbenzene | 3.3:3.0 | 0.1 | 6800 | 137,000 |

APPLICATION EXAMPLES

EXAMPLES 16-23

The procedure of Example 1 was followed in producing the products summarized below in Table II. The relative ratios of initial reactants were varied in the first three reactions. In the subsequent five reactions the reactant ratio was held constant while the type of acidic clay catalyst was varied.

TABLE II

| Example | Reactant Ratio DPA: Alkylating Agent | Catalyst | Reaction Temperature °C. |
|---|---|---|---|
| 16 | 4:1 | *SF1 (8.0) | 112-130 |
| 17 | 3:1 | *SF1 (8.0) | 112-130 |
| 18 | 2:1 | *SF1 (8.0) | 113-130 |
| 19 | 4:1 | *F-105 (4.8) | 112-130 |
| 20 | 4:1 | *F-40 (2.5) | 113-130 |
| 21 | 4:1 | *F-112 (1.2) | 113-130 |
| 22 | 4:1 | **KSF (2.1) | 113-200 |
| 23 | 4:1 | **K-10 (3.6) | 112-130 |

*Acid activated clay from Filtrol Corporation, value in parenthesis is mg. of KOH to neutralize 1 gram of clay.
**Acid activated Gridler clays from Chemetron Corporation, value in parenthesis is pH of 5 grams clay in 100 grams water.

In order to evaluate the effectiveness of the compounds of this invention as a stabilizer for polymers, the compounds were incorporated into an oxidizable polymer. The following example is presented to illustrate and not limit the use of the compounds of the present invention.

The compositions produced in the reactions described in Examples 16–23 were evaluated for their antioxidant properties by comparison with a commercially available control, 4,4'-bis($\alpha,\alpha$-dimethylbenzyl)diphenylamine available through Uniroyal, Inc. under the tradename "Naugard 445."

These compounds were evaluated by the oxygen absorption test. The oxygen absorption tests were conducted by dissolving in toluene portions of an unstabilized SBR 1006 polymer. The toluene contained the antioxidant to be tested at a level of 1.00 part of antioxidant per 100 parts of SBR 1006 polymer. The cements so formed were poured onto aluminum foil so as to form a thin film. After drying, the weight of rubber was determined for each sample. Thereafter, the foil with the adhering rubber strip was placed in the oxygen absorption apparatus. The time required for each sample to absorb 1.0 percent oxygen was determined and recorded in Table III. This testing procedure is described in further detail in Industrial and Engineering Chemistry, 43, p. 456 (1951) and Industrial and Engineering Chemistry, 45, p. 392 (1953).

The following are results obtained in SBR 1006 at the 1.0 part level at 100° C.

TABLE III

OXYGEN ABSORPTION IN SBR 1006

| Antioxidant | Hours to Absorb 1% Oxygen |
|---|---|
| Control A.0 | 380 |
| Example 16 | 500 |
| Example 17 | 366 |
| Example 18 | 598 |
| Example 19 | 650 |
| Example 20 | 467 |
| Example 21 | 508 |
| Example 22 | 504 |
| Example 23 | 526 |

INDUSTRIAL UTILITY

The products of this invention include a series of non-volatile, high activity, white or nearly white polymeric diphenylamine compounds. Polymeric antioxidants in a variety of molecular weight and melting point ranges may be produced to satisfy differing requirements of various polymers and applications. This variety of products may be prepared from the same reaction system by merely altering conditions and reactants.

The polymeric products of this invention can be used for the protection of oxidizable organic polymers, chiefly rubber and plastic polymers. The rubber polymers include natural rubber, styrene-butadiene rubbers (SBR), acrylonitrile-butadiene rubbers (NBR), polybutadiene, polyisoprene, ethylene-propylene (EP), ethylene-propylene-diene monomer rubbers (EPDM), and polychloroprene. The plastic polymers include polyesters, polyethylene, polypropylene, poybutylene, and other polyolefins.

The ability to protect oxidizable polymers from the destructive action of oxidation for substantially longer than currently available materials make these high molecular weight polymeric antioxidants valuable in applications where long term protection is a requirement. Many under-the-hood automotive rubber applications such as belts, hoses, seals, and gaskets lend themselves to the use of these polymeric antoxidants for improved performance and prolonged life.

When incorporated into styrene-butadiene rubber as a raw polymer stabilizer, polymeric antioxidants of this invention were found to demonstrate superior antioxidant activity compared to commercially available diaryl-substituted diphenylamines. In an oxygen absorption test in which the reported results are expressed in hours to a 1 percent uptake of oxygen by the test sample, polymeric products of this invention had results of up to 650 hours compared to 380 hours for the commercial control, a diaryl-substituted diphenylamine. This demonstrates excellent antioxidant activity.

We claim:

1. A polymeric reaction product of diphenylamine and di-alpha-hydroxyalkylbenzene wherein the hydroxyalkyl groups are positioned meta or para to each other and the alkyl group contains from 1 to 8 carbon atoms.

2. A polymeric compound of claim 1 wherein said di-alpha-hydroxyalkylbenzene is selected from the group of compounds having the following formulae (III), or (IV):

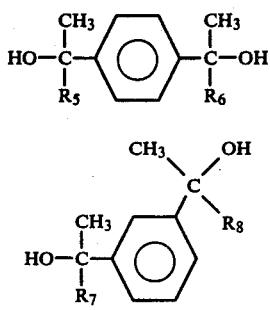

wherein $R_5$, $R_6$, $R_7$, and $R_8$ are the same or different radicals selected from the group consisting of alkyl groups of from 1 to 8 carbon atoms.

3. A polymeric compound of claim 1 having a molecular weight ranging from about 485 to about 200,000 as determined by gel permeation chromatography.

4. A polymeric compound of claim 2 wherein $R_1$, $R_2$, $R_3$, $R_4$, $R_5$, $R_6$, $R_7$ and $R_8$ are methyl radicals.

5. A polymeric compound comprising the polymeric reaction product of diphenylamine and an additional component, said additional component comprising one or more compounds of structural formula (1)

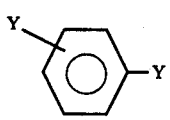

said polymeric compound containing repeat units of structure VI:

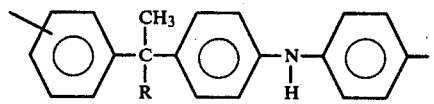

wherein (1) is para or meta substituted, Y is structure (A),

and R is an alkyl radical of from 1 to 8 carbon atoms.

6. A polymeric compound of claim 5 further comprising repeat units of structure VII:

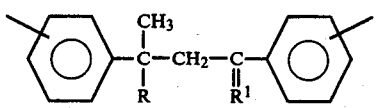

wherein R' is an alkylidene radical of from 1 to 7 carbon atoms.

7. A polymeric compound according to claim 5 further comprising repeat units of structure v:

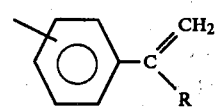

8. A process for making a polymeric compound comprising: contacting diphenylamine with a second reactant and an acid catalyst, said second reactant comprising one or more meta or para substituted di-alpha-hydroxyalkylbenzene wherein the alkyl radical contains from 1 to 8 carbon atoms.

9. A process according to claim 8 wherein said second reactant is selected from the group of compounds having the structural formulae III or IV

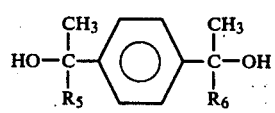

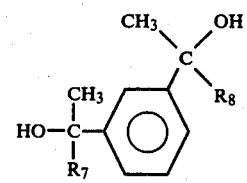

wherein $R_5$, $R_6$, $R_7$, and $R_8$ are the same or different alkyl radicals of from 1 to 8 carbon atoms.

10. A process according to claim 8 wherein R is a methyl radical.

11. A process according to claim 8 comprising contacting diphenylamine, said second reactant and an acid catalyst in an inert solvent.

12. A process according to claim 8 wherein the acid catalyst is an acid activated clay.

13. A process according to claim 8 wherein the acid catalyst is $BF_3 \cdot O(C_2H_5)_2$.

* * * * *